United States Patent
Yager

(10) Patent No.: US 11,750,601 B1
(45) Date of Patent: *Sep. 5, 2023

(54) USER AUTHENTICATION BASED ON TELEMATICS INFORMATION

(71) Applicant: Allstate Insurance Company, Northbrook, IL (US)

(72) Inventor: Floyd Yager, Park Ridge, IL (US)

(73) Assignee: Allstate Insurance Company, Northbrook, IL (US)

( * ) Notice: Subject to any disclaimer, the term of this patent is extended or adjusted under 35 U.S.C. 154(b) by 10 days.

This patent is subject to a terminal disclaimer.

(21) Appl. No.: 17/487,883

(22) Filed: Sep. 28, 2021

Related U.S. Application Data

(63) Continuation of application No. 16/824,812, filed on Mar. 20, 2020, now Pat. No. 11,165,769, which is a
(Continued)

(51) Int. Cl.
*H04L 29/06* (2006.01)
*H04L 9/40* (2022.01)
(Continued)

(52) U.S. Cl.
CPC .......... *H04L 63/0853* (2013.01); *G06F 21/34* (2013.01); *H04L 63/102* (2013.01); *H04W 12/06* (2013.01); *G06F 2221/2111* (2013.01)

(58) Field of Classification Search
CPC ... H04L 63/0853; H04L 63/102; G06F 21/34; G06F 2221/2111; H04W 12/06
See application file for complete search history.

(56) References Cited

U.S. PATENT DOCUMENTS

| 6,857,073 B2 | 2/2005 | French et al. |
| 7,164,117 B2 | 1/2007 | Breed et al. |

(Continued)

FOREIGN PATENT DOCUMENTS

WO 2015152905 A1 10/2015

OTHER PUBLICATIONS

"Designing challenge questions for location-based authentication systems: a real-life study" by Yusuf Albayram, et al. Downloaded from Human-centric Computing and Information Sciences DOI 10.1186/s13673-015-0032-3, Jun. 2015.
(Continued)

*Primary Examiner* — Mahfuzur Rahman
(74) *Attorney, Agent, or Firm* — Dinsmore & Shohl LLP

(57) ABSTRACT

Aspects of the present disclosure are directed to systems and methods for authenticating a user requesting access to a computing resource based on telematics data. A system may include a telematics device associated with a vehicle having one or more sensors arranged therein, a mobile device, and a server computer. The server computer may receive telematics data of a user associated with the vehicle from the telematics device, store the telematics data in memory, receive a request to authenticate the user, generate one or more questions for authenticating the user based on the telematics data, transmit the one or more questions for presentation to the user, receive one or more answers to the one or more questions from the mobile device, and transmit, to the mobile device, an indication of whether the user is authenticated based on the one or more answers.

20 Claims, 5 Drawing Sheets

Related U.S. Application Data continuation of application No. 15/400,104, filed on Jan. 6, 2017, now Pat. No. 10,623,401.

(51) Int. Cl.
*G06F 21/34* (2013.01)
*H04W 12/06* (2021.01)

(56) References Cited

U.S. PATENT DOCUMENTS

| | | |
|---|---|---|
| 7,231,657 B2 | 6/2007 | Honarvar et al. |
| 8,112,817 B2 | 2/2012 | Chiruvolu et al. |
| 8,121,942 B2 | 2/2012 | Carlson et al. |
| 8,301,684 B2 | 10/2012 | Mitchell et al. |
| 8,346,217 B2 | 1/2013 | Crawford et al. |
| 8,353,008 B2 | 1/2013 | Holtz et al. |
| 8,548,818 B2 | 10/2013 | Wagner et al. |
| 9,001,977 B1 | 4/2015 | Ramalingam et al. |
| 9,282,090 B2 | 3/2016 | Liberman et al. |
| 9,305,412 B2 | 4/2016 | Winkelman |
| 9,306,924 B2 * | 4/2016 | Lehmann .............. H04L 63/102 |
| 9,591,482 B1 * | 3/2017 | Finnerty .............. H04W 12/35 |
| 9,838,480 B2 | 12/2017 | Sabbaghian et al. |
| 9,894,199 B1 | 2/2018 | Wiechman et al. |
| 9,900,315 B2 | 2/2018 | Yusuf et al. |
| 10,097,546 B2 | 10/2018 | Hao et al. |
| 10,623,401 B1 | 4/2020 | Yager |
| 2002/0103999 A1 | 8/2002 | Camnisch et al. |
| 2004/0189441 A1 | 9/2004 | Stergiou |
| 2005/0046584 A1 | 3/2005 | Breed |
| 2006/0129834 A1 | 6/2006 | Ellmore |
| 2006/0208169 A1 | 9/2006 | Breed et al. |
| 2006/0265123 A1 | 11/2006 | Chon et al. |
| 2009/0305667 A1 | 12/2009 | Schultz |
| 2009/0327138 A1 | 12/2009 | Mardani et al. |
| 2010/0015963 A1 | 1/2010 | Hesse et al. |
| 2013/0191898 A1 | 7/2013 | Kraft |
| 2014/0096217 A1 * | 4/2014 | Lehmann .............. H04W 12/50 726/7 |
| 2014/0137219 A1 | 5/2014 | Castro et al. |
| 2014/0236828 A1 | 8/2014 | Carlson et al. |
| 2014/0294180 A1 * | 10/2014 | Link, II .............. G08G 1/205 380/270 |
| 2015/0150104 A1 | 5/2015 | Melzer |
| 2015/0187019 A1 | 7/2015 | Fernandes et al. |
| 2015/0304324 A1 | 10/2015 | Kirsch et al. |
| 2016/0057110 A1 | 2/2016 | Li et al. |
| 2017/0021764 A1 | 1/2017 | Adams et al. |
| 2017/0337813 A1 | 11/2017 | Taylor |
| 2018/0091596 A1 | 3/2018 | Alvarez et al. |
| 2018/0174376 A1 | 6/2018 | Avary et al. |

OTHER PUBLICATIONS

"A Study in Authentication via Electronic Personal History Questions" by Ann Nosseir et al, Jun. 2010.

* cited by examiner

USER AUTHENTICATION BASED ON TELEMATICS INFORMATION

CROSS REFERENCE TO RELATED APPLICATIONS

This application is a continuation of and claims priority to co-pending U.S. application Ser. No. 16/824,812, filed Mar. 20, 2020, and entitled "User Authentication Based on Telematics Information," which is a continuation of U.S. application Ser. No. 15/400,104, filed Jan. 6, 2017, and entitled "User Authentication Based on Telematics Information," which are incorporated herein by reference in their respective entireties.

TECHNICAL FIELD

Aspects of the disclosure generally relate to information security, access control, and authentication. In particular, various aspects of the disclosure relate to security protocols and telematics information used to authenticate an individual and prevent unauthorized access to computing resources of a computing system or computing device.

BACKGROUND

Authentication refers to verifying an identity of an individual. One type of authentication procedure often employed involves authenticating individuals based on username and password combinations. Despite advice to the contrary, individuals often use the same or similar passwords for different user accounts. As a result, compromising one user account of an individual may compromise multiple user accounts. Therefore a need exists for improved authentication procedures.

SUMMARY

In light of the foregoing background, the following presents a simplified summary of the present disclosure in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the present disclosure are directed to computerized systems, methods, devices, and apparatuses for a user authentication system based on telematics information. For example, the system may provide an access control process that uses collected telematics information for a vehicle of an individual to authenticate the identity of the individual or authorize the individual to access a computing resource, such as a secured device, application, account, or the like.

The disclosure describes a system comprising a telematics device associated with a vehicle having one or more sensors arranged therein, a mobile device of a user associated with the vehicle, and a server computer comprising hardware including a processor and memory. The server computer may be configured to receive, from the one or more sensors and via the telematics device, telematics data of the user associated with the vehicle, store the telematics data of the user associated with the vehicle in the memory of the server computer, receive, from the mobile device, a request to authenticate the user to access a computing resource, generate one or more questions for authenticating the user based on the telematics data of the user, transmit, to the mobile device, the one or more questions for presentation to the user, receive, from the mobile device, one or more answers to the one or more questions, and transmit, to the mobile device, an indication of whether the user is authenticated based on the one or more answers.

The disclosure also describes an apparatus comprising at least one processor, a network interface configured to communicate, via a network, with a telematics device and a first computing device, and a memory storing computer-readable instructions that, when executed by the at least one processor, cause the apparatus to receive, from the telematics device, telematics data of a user associated with a vehicle, store the telematics data of the user associated with the vehicle in the memory, receive, from the first computing device, a request to authenticate the user to access a computing resource, generate one or more questions for authenticating the user based on the telematics data of the user, transmit, to the first computing device, the one or more questions for presentation to the user, receive, from the first computing device, one or more answers to the one or more questions, and transmit, to the first computing device, an indication of whether the user is authenticated based on the one or more answers.

In addition, aspects of this disclosure provide a method that includes receiving, at a computing device and from a telematics device associated with a vehicle having one or more sensors arranged therein, telematics data of a user associated with the vehicle, storing, at a data store of the computing device, the telematics data of the user associated with the vehicle, receiving, at the computing device and from a mobile device of the user, a request to authenticate the user to access a computing resource, generating, by at least one processor of the computing device, one or more questions for authenticating the user based on the telematics data of the user, transmitting, to the mobile device, the one or more questions for presentation to the user, receiving, from the mobile device, one or more answers to the one or more questions, and transmitting, to the mobile device, an indication of whether the user is authenticated based on the one or more answers.

The methods and systems of the above-referenced embodiments may also include other additional elements, steps, computer-executable instructions or computer-readable data structures. In this regard, other embodiments are disclosed and claimed herein as well. The details of these and other embodiments of the present disclosure are set forth in the accompanying drawings and the description below. Other features and advantages of the disclosure will be apparent from the description, drawings, and claims.

BRIEF DESCRIPTION OF THE DRAWINGS

The present disclosure is illustrated by way of example, and is not limited, by the accompanying figures in which like reference numerals indicate similar elements and in which.

DETAILED DESCRIPTION

Figure 1A:
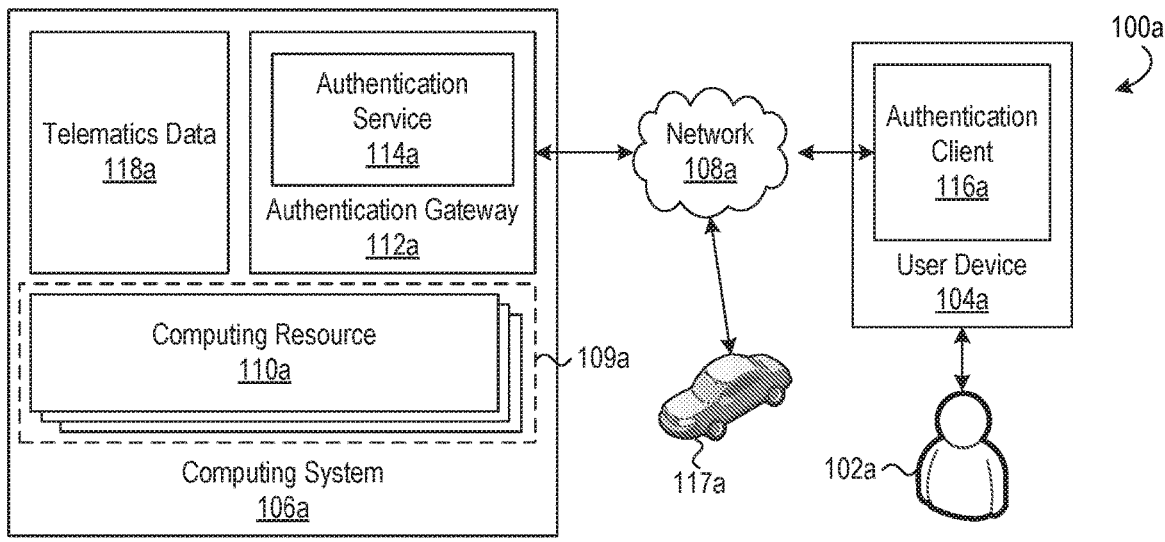
FIG. 1A depicts a first example of an implementation of a system configured for authenticating a user operating a user device in accordance with aspects described herein.

In the following description of the various embodiments, reference is made to the accompanying drawings, which form a part hereof, and in which is shown by way of illustration, various embodiments of the disclosure that may be practiced. Other embodiments may be utilized.

In accordance with various aspects of the disclosure, computerized methods, systems, devices, and apparatuses are disclosed that provide an authentication system for authenticating a user by challenging the user to answer questions related to telematics data corresponding to a vehicle of the user. In particular, the authentication system may receive and store telematics data collected from a user's vehicle while the user is driving and utilize the telematics data to generate one or more questions for authenticating the user to access one or more computing resources. If the user answers the one or more questions correctly (e.g., the response from the user matches the telematics data or determination made from the telematics data), then the user may be successfully authenticated, and the authentication system may grant the user access to the one or more computing resources. In some cases, the authentication system may be referred to as a telematics-based authentication system or an authentication manager or tool as described herein.

The present disclosure teaches an authentication system that may be beneficial in authenticating users based on information that is specific to each user and preventing unauthorized access to one or more computing resources requested by the users. The authentication system may be integrated across a plurality of platforms and may be deployed by an insurance provider that offers authentication services and benefits to users (e.g., insurance policy holders), in which the users may own, rent, or lease vehicles that are insured by the insurance provider. That is, the insurance provider may offer authentication services or benefits to users who are insurance policy holders with registered accounts, wherein the users may have opted in for the authentication services.

In particular, the authentication system may receive telematics data collected from a telematics device in a user's vehicle or from a user's mobile device while the user is driving. For example, a mobile application may be installed on the user's mobile device in order to monitor telematics data in a vehicle using one or more sensors of the mobile device or using one or more sensors arranged in the vehicle. The telematics data may include real-time data that is collected by one or more sensors (e.g., accelerometer, GPS, gyroscope, and the like) while the user is driving, such as the user's speeds, accelerations, braking, GPS coordinates, the vehicle location, and the like. In some cases, the real-time data may be collected over a predetermined period of time and may include at least one of a driving speed, an acceleration measurement, a braking measurement, a steering measurement, a number of miles driven for a trip, a road condition rating, a trip time, or a trip duration.

The telematics device or a mobile device of a user may transmit the collected telematics data to the authentication system, and the authentication system may store the telematics data in a data store accessible to the authentication system. Furthermore, the authentication system may receive an authentication request from the mobile device of the user to access one or more computing resources. The authentication system may utilize the stored telematics data to generate one or more challenge questions for authenticating the user. Challenge questions may refer to questions that are presented to a user for the purposes of authenticating the user. The authentication system may transmit the one or more challenge questions to the mobile device for presentation to the user. An answer set may accompany each challenge question and may include multiple answer selections (e.g., choices), and the authentication system may generate a plurality of answer choices for each multiple-choice challenge question based on analyzing the telematics data of the user. The challenge questions may prompt the user to select one of the answer choices as the answer to the challenge question. If the user answers at least a subset of the one or more challenge questions correctly, then the user may be successfully authenticated, and the authentication system may grant the user access to the one or more computing resources. Concrete examples of challenge questions, answer sets, and answer selections are found throughout the disclosure. The examples found below are provided by way of example only to help illustrate the aspects associated with the authentication techniques described herein. Additional and alternative examples will be appreciated with the benefit of the disclosures provided herein.

In some embodiments, the authentication system may generate the one or more challenge questions for a user by parsing the telematics data to identify location-related data, time-related data, and route-related data. For example, location-related data may comprise data regarding locations to which the user has driven, such as towns, cities, states, countries, retail establishments, places of business, points of interest, and other types of locations to which the user may travel. Time-related data may comprise data regarding dates and times at which the user has driven to various locations, as well as other timeframes during which the user is typically driving. Route-related data may comprise data regarding the specific routes the user takes while driving to different locations at varying times. For example, routes may include a combination of specific types of roads that the user drives his vehicle on, such as toll roads, highways, turnpikes, country roads, expressways, boulevards, and the like.

Upon parsing the telematics data, the authentication system may identify one or more anomalies in at least one of the location-related data, time-related data, and route-related data and generate one or more challenge questions for authenticating the user based on the one or more anomalies. For example, anomalies may include one or more locations, times, and/or driving routes that a user has driven that deviate from what is standard, normal, or expected for the user. In some cases, the authentication system may collect telematics data of a user over various periods of time (e.g., every few minutes, 30 minutes, hour, day, week, month, or any other interval of time) and identify driving behaviors and/or driving patterns that are typical for the user. For example, the user may drive to work every morning at 9 AM, and may commute back home at 5 PM every evening. The authentication system may recognize such routines or patterns of the user and may particularly identify driving trips that are unusual or atypical of the user's previous driving history. For example, the user may divert from his normal or typical schedule of commuting back home at 5 PM in order to go to a restaurant, run errands, stop at a grocery store, pick up dry-cleaning, pick up or drop off children at school or another event, or the like. The telematics device may capture telematics data associated with these driving trips that may be infrequent or atypical of the user's regular driving behaviors, and the authentication system may identify these driving trips as anomalies. Based on the anomalies, the authentication system may generate one or more challenge questions that only the user would be able to answer correctly based on his or her knowledge of his own driving history.

In some embodiments, the authentication system may also integrate calendar information to identify one or appointments and utilize data regarding the one or more appointments in conjunction with the telematics data to generate one or more challenge questions for authentication. For example, the authentication system may receive telematics data from the user's vehicle indicating that the user drove in the middle of a workday to a location that differs from the user's previous driving history. The authentication system may receive calendar information that verifies and provides more information regarding the drive, and the authentication system may utilize this information to generate challenge questions that are specific to the one or more appointments that are listed in the user's calendar.

Additionally, the authentication system may generate one or more challenge questions for authentication based on insurance information, vehicle information, and/or maintenance information of the user. In particular, the authentication system may access insurance information of a user to identify that the user is an insurance policy holder for one or more types of insurance policies. For example, the authentication system may have access to the user's insurance information, including information on the user's one or more insurance policies (e.g., auto insurance, home insurance, renters insurance, and the like), information on the user's insured products (e.g., one or more vehicles, home, rental properties, and the like), and/or information on when the user has participated in maintenance-related activities for the user's insured products. By utilizing insurance information, the authentication system may generate one or more challenge questions regarding costs of the user's insurance premiums, costs of the user's insurance deductibles, one or more types of insurance coverage the user has, number and/or types of products insured under the user's one or more insurance policies, number, types, and/or content of insurance claims that the user has initiated, number, names, and/or details of one or more individuals covered under the user's one or more insurance policies, and the like.

In additional embodiments, the authentication system may generate one or more questions specific to maintenance information of the user's insured products. For example, the user may have auto insurance to cover his or her vehicle and may take the vehicle to a repair shop or a service center to get an oil change for every 3,000 miles, 5,000 miles, 7,000 miles, or any other number of miles driven in the vehicle. In some cases, the authentication system may have access to information on when the user has taken the vehicle to get an oil change, and the authentication system may generate one or more challenge questions that are specific to the user's maintenance of the vehicle.

Furthermore, the data used to generate the one or more challenge questions by the authentication system may be continually updated with the occurrence of new telematics activities (e.g., driving trips) or information. For example, the authentication system may receive telematics data from the telematics device over predetermined periods of time (e.g., every 30 minutes, hour, day, week, month, or any other interval of time) for every drive that a user is taking. The authentication system may use telematics data for relatively new or relatively recent drives to generate the one or more challenge questions, whereas telematics data for relatively older drives may be discarded. In some cases, the authentication system may modify or update one or more challenge questions based on new telematics data received from the telematics device. For example, the authentication system may have previously generated challenge questions using telematics data collected over a first period of time. To keep the challenge questions current, the authentication system may modify the previously generated challenge questions using the new telematics data collected over a second period of time. Generating challenge questions based on relatively new telematics data provides additional security should the telematics data become compromised. Compromised telematics data may simply be discarded, and the telematics data for new drives may replenish the pool used to generate or modify the one or more challenge questions.

In some embodiments, the challenge questions generated by the authentication system may comprise a combination of one or more static challenge questions and/or one or more dynamic challenge questions for authenticating the user. For example, static challenge questions may comprise answers that do not change, whereas dynamic challenge questions may comprise answers that may be continually changing or updated based on new information acquired by the authentication system. Examples of static challenge questions may include (and are not limited to) questions regarding specific facts about a user, such as the user's birthday, names of the user's family members covered by an insurance policy, make, model, and/or year of the user's one or more vehicles, a date of the user's purchase of a vehicle, information on insured products (e.g., the user's home, rental property, etc.), the user's drivers' license number and state, and other information specific to the user. Examples of dynamic challenge questions may include (and are not limited to) questions regarding user information that may be continually changing, such as driving patterns of a user, locations to which the user has driven (e.g., within the past week, month, or the like), days and times at which the user has driven, driving speeds of the user, acceleration rates of the user, braking habits of the user, routes driven by the user, and the like. By utilizing a combination of static and dynamic challenge questions, the authentication system may provide a secure access control process in order to authenticate the identity of a user and/or authorize the user to access a secured device, application, and/or account.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. Furthermore a set, as used herein, refers to a collection of one or more elements.

The authentication techniques described herein may be used in addition to or in lieu of authentication using a username and password combination, personal identification number (PIN), biometric data, or the like. Additional aspects will be appreciated upon review of the additional disclosures provided in further detail below.

Referring now to FIG. 1A, a first example of an implementation of a system 100a configured for authenticating a user 102a operating a user device 104a is shown. The user 102a may comprise a driver associated with a vehicle 117a. As seen in FIG. 1A, the user device 104a is in signal communication with the vehicle 117a and a computing system 106a via a network 108a. The computing system 106a may include or otherwise provide access to a set 109a of computing resources 110a. The computing system 106a, in this example, may also include an authentication gateway 112a configured to provide an authentication service 114a. The user device 104a may include an authentication client 116a configured to exchange communications with the authentication gateway 112a and invoke the authentication service 114a in order to authenticate the user 102a. The computing system 106a, in this example, also may store telematics data 118a used for the authentication process, in which the telematics data 118a is collected from the vehicle 117a.

In an example scenario, the user 102a may operate the user device 104a and request access to one of the computing resources 110a of the computing system 106a. For example, the user 102a may be attempting to log into an email account (e.g., a personal account or a work email account), online banking, a social media account, or other types of services provided by the computing resources 110a. In response to the access request from the user device 104a, the authentication client 116a may transmit, to the computing system 106a, an authentication request. The authentication client 116a may format the authentication request according to a format required by the authentication service 114a. The authentication gateway 112a may receive the authentication request and invoke the authentication service 114a. The authentication service 114a may then determine whether to authenticate the user 102a. This scenario is described by way of example only. Additional and alternative scenarios will be appreciated with the benefit of this disclosure.

As described in further detail below, authenticating the user 102a may include, in example implementations, receiving telematics data for a vehicle 117a of a user, receiving a request to authenticate the user, generating a set of challenge questions to present to the user based on the telematics data, transmitting the set of challenge questions to the user device 104a for presentation to the user, receive answers to the challenge questions from the user device, and determining whether or not to successfully authenticate the user based on the answers to the challenge questions.

In FIG. 1A, the computing system 106a itself includes the components configured to carry out the authentication process. The arrangement depicted in FIG. 1A is but one example of a possible arrangement for the user device 104a, computing system 106a, vehicle 117a, and authentication gateway 112a in the system 100a for authenticating a user. Alternative implementations, configurations, and arrangements may be selectively employed.

Figure 1B:
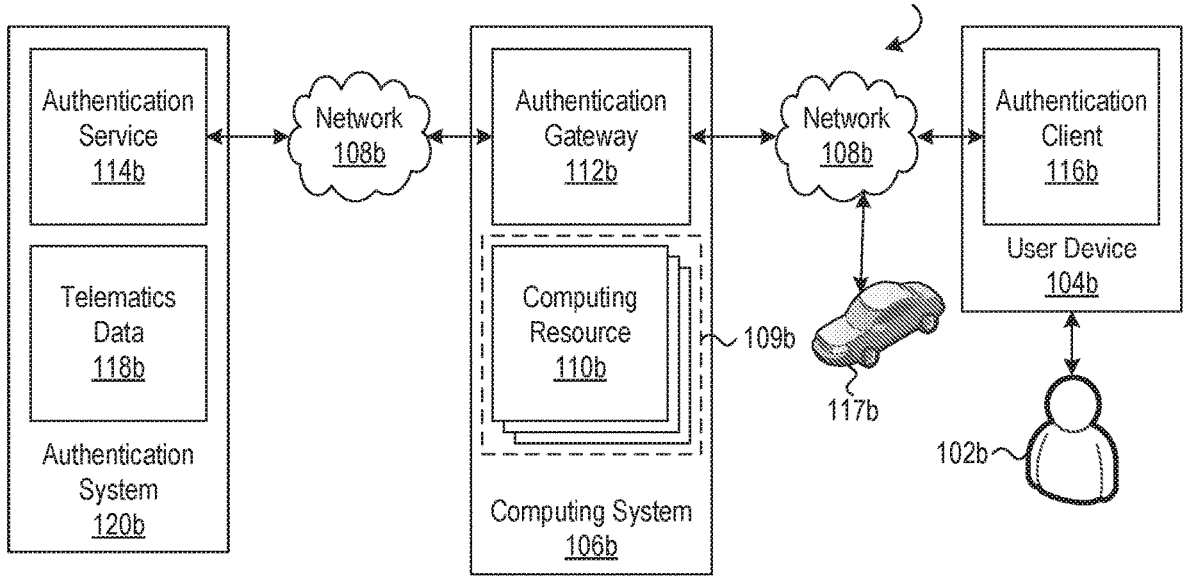
FIG. 1B depicts a second example of an implementation of a system configured for authenticating a user operating a user device in accordance with aspects described herein.

In FIG. 1B, for example, a second example of an implementation of a system 100b configured for authenticating a user 102b operating a user device 104b is shown. The user 102b may comprise a driver associated with a vehicle 117b. The system 100b in FIG. 1B similarly includes a user device 104b in signal communication with the vehicle 117b and a computing system 106b via a network 108b. The user device 104b likewise includes an authentication client 116b, and the computing system 106b likewise includes a set 109b of computing resources 110b as well as an authentication gateway 112b.

In contrast to FIG. 1A, however, the authentication service 114b and the telematics data 118b in FIG. 1B reside at an authentication system 120b. The authentication service 114b, in this example, is in signal communication with the authentication gateway 112b via the network 108b. Accordingly, the computing system 106b delegates to the authentication system 120b the responsibility of determining whether to authenticate the user 102b. With the example arrangement depicted in FIG. 1B, the authentication system 120b may handle the authentication process on behalf of multiple computing systems such as, e.g., computing system 106b. In this way, computing systems (such as the computing system 106b) may only need to be configured to proxy the authentication request received from a user device (such as the user device 104b), the challenge questions generated for the user 102b to answer, and the answers received.

In an example scenario, the user 102b may operate the user device 104b and transmit, to the computing system 106b, an access request to one of the computing resources 110b. The access request may be received, for example, at a web gateway of the computing system 106b which has been omitted from FIG. 1B for the sake of clarity. The web gateway may handle inbound and outbound communications between the computing system 106b and the user device 104b and/or the authentication system 120b. In response to this access request, the authentication gateway 112b may generate an authentication request and transmit the authentication request to the authentication system 120b. The authentication gateway 112b may also format the authentication request according to a format required by the authentication service 114b. The authentication system 120b may also include a web gateway (also omitted for the sake of clarity) to handle inbound authentication requests and outbound authentication responses. The authentication gateway 112b may proxy the communications exchanged between the authentication service 114b and the authentication client 116b. In another example implementation, the authentication gateway 112b may simply relay the communications exchanged between the authentication service 114b and the authentication client 116b. In either scenario, the authentication service 114b may determine whether to authenticate the user 102b (using challenge questions generated based on telematics data 118b) and provide the authentication result to the computing system 106b. If successfully authenticated, the computing system 106b may grant the user device 104b access to one or more of the computing resources 110b. These scenarios are again described by way of example only. Additional and alternative scenarios will be appreciated with the benefit of this disclosure.

Figure 1C:
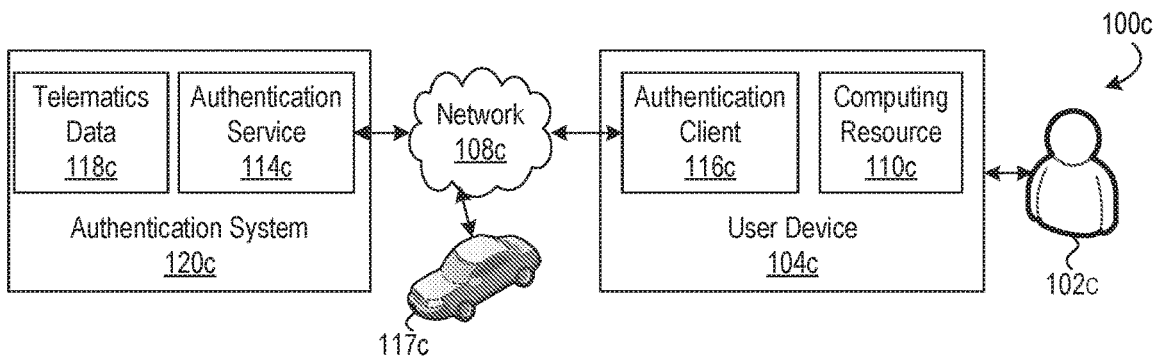
FIG. 1C depicts a third example of an implementation of a system configured for authenticating a user operating a user device in accordance with aspects described herein.

In FIG. 1C, for example, a third example of an implementation of a system 100c configured for authenticating a user 102c operating a user device 104c is shown. The user 102c may comprise a driver associated with a vehicle 117c. FIG. 1C again includes a user device 104c that includes an authentication client 116c. In FIG. 1C, however, the computing resource 110c resides at the user device 104c, and the user device 104c is in signal communication with the vehicle 117c and the authentication system 120c via the network 108c. The authentication system 120c similarly includes the authentication service 114c and the telematics data 118c. The authentication client 116c may thus invoke the authentication service 114c to authenticate the user 102c at the user device 104c. The authentication system 120c may also include a web gateway as described above to handle the inbound and outbound communications exchanged between the authentication system 120c and the user device 104c. In this way, the authentication system 120c may handle the authentication process on behalf of multiple user devices such as, e.g., user device 104c. If successfully authenticated, the authentication client 116c may grant the user 102c access to the computing resource 110c. The authentication client 116c may grant access to the computing resource 110c in particular (e.g., upon launch of the computing resource) or to the user device 104c in general (e.g., during a login attempt at the user device).

In an example scenario, the user 102c may request access to the computing resource 110c. In response to the access request, the authentication client 116c may generate and transmit an authentication request to the authentication system 120c. The authentication client 116c may also format the authentication request according to a format required by the authentication service 114c. Upon receipt of the authentication request, the authentication service 114c may then determine whether to authenticate the user 102c and grant the user access to the computing resource 110c.

The computing resources 110a—b may include various types of computing resources. Examples of computing resources include: software applications, programs, and services (native and virtualized); data stores, databases, and computer files; processors and processing time; hardware, input/output (I/O) devices, peripherals; and other types of computer components that access control processes may limit access to. As seen in FIGS. 1A-C, computing resources may reside locally at a user device directly operated by a user and/or may reside remotely at a computing device indirectly operated by the user via a local user device.

The networks 108a—c may include various types of networks. For example, the networks 108a—c may include one or more of a wired network and/or a wireless network. Example networks that may be selectively employed include wired and wireless local area networks (LANs), wide area networks (WANs) such as the Internet, cellular communication networks, and other types of wired and wireless networks configured for telecommunication. Network communications may utilize various network communication protocols. Examples of network communication protocols that may be selectively employed include TCP/IP, Ethernet, FTP, HTTP, GSM, CDMA, Wi-Fi (802.11), and WiMAX.

Figure 2:
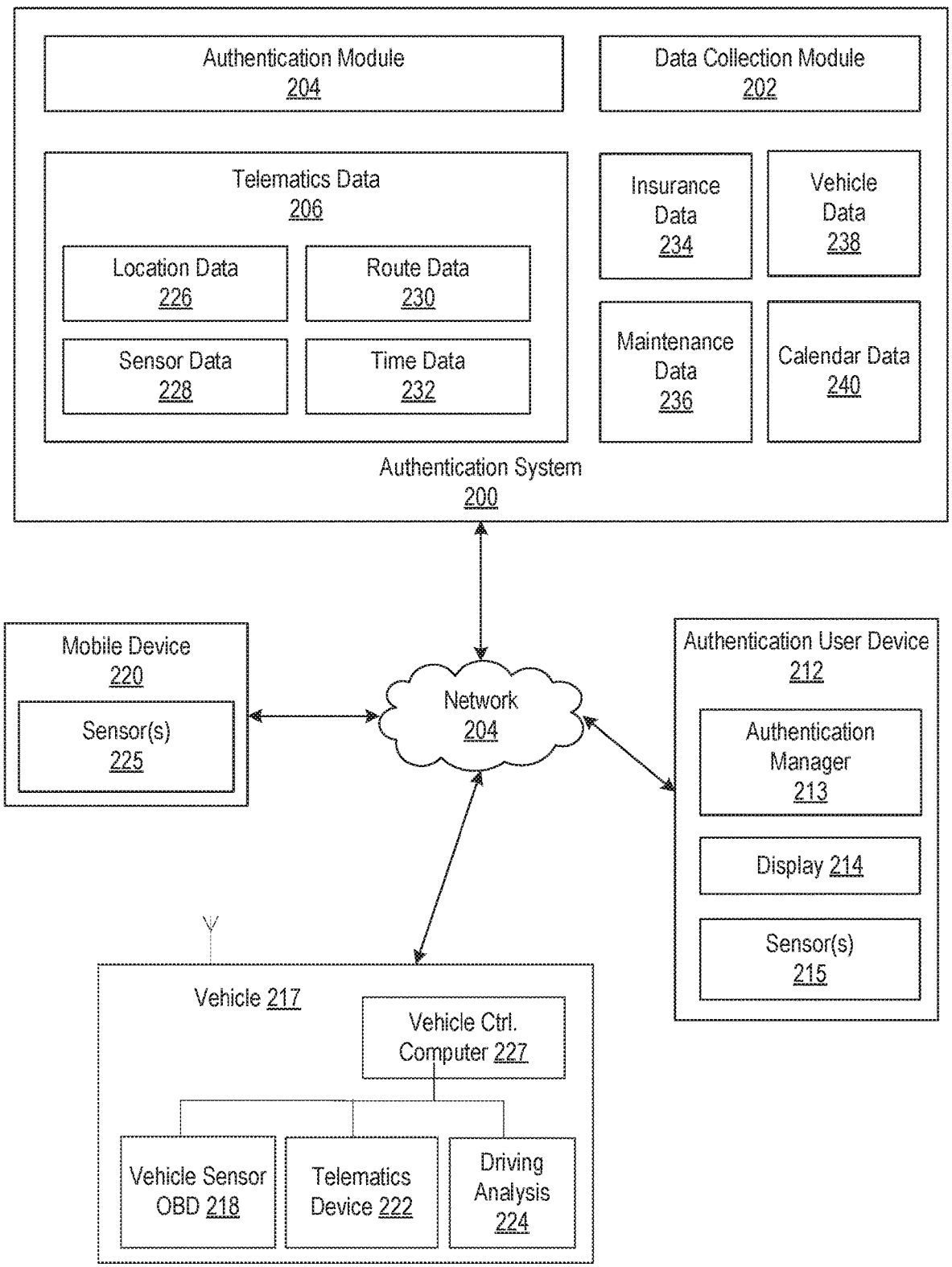
FIG. 2 depicts an example of an implementation of an authentication system in accordance with aspects described herein.

With reference to FIG. 2, an example of an implementation of an authentication system 200 is shown. The authentication system 200 may be a special-purpose computing device configured to perform or initiate aspects associated with authenticating a user. As seen in FIG. 2, the authentication system 200 is in signal communication with an authentication user device 212, a vehicle 217, and a mobile device 220 via a network 204. The network 204, authentication user device 212, and the vehicle 217 may respectively be the same as or at least similar to the networks 108a-c, user devices 104a-c, and the vehicles 117a-c, respectively, discussed above with reference to FIGS. 1A-C. Collectively, these specialized computing devices may form at least a part of a telematics-based user authentication system. Although only one of each of the components 200, 212, 217, and 220 are shown in FIG. 2, it is understood that there may be any number of components 200, 212, 217, and 220 in the network environment.

The network 204 may be any type of network, like the networks 108a-c described above, and may use one or more communication protocols (e.g., protocols for the Internet (IP), Bluetooth, cellular communications, satellite communications, and the like.) to connect computing devices and servers within the network environment so they may send and receive communications between each other. In particular, the network 204 may include a cellular network and its components, such as cell towers. Accordingly, for example, a mobile device 220 (e.g., a smartphone, flip-phone, tablet, and the like) or an authentication user device 212 of a user (e.g., a driver) associated with vehicle 217 may communicate, via a cellular backhaul of the network 204, with an authentication system 200 to request to access a computing resource, such as a secured device, application, account, or the like. For example, the mobile device 220 or authentication user device 212 may automatically request for the authentication system 200 to provide authentication services to a user based on collecting and analyzing the user's telematics data. In some cases, the request for authentication may be performed automatically by the mobile device 220 or authentication user device 212 while the user is attempting to login to a computing resource residing on the authentication user device 212. In another example, the mobile device 220 or the authentication user device 212 of the user associated with the vehicle 217 may communicate, via the cellular backhaul of the network 204, with the authentication system 200 to provide information regarding the user's vehicle, insurance coverage, maintenance history, preferences, account, or the like.

In some cases, the mobile device 220 or the authentication user device 212 of the user associated with the vehicle 217 may also communicate, via the cellular backhaul of the network 204, with the authentication system 200 to receive one or more challenge questions presented to the user by the authentication system, submit answers to the one or more challenge questions, and receive an indication of whether or not the user is authenticated to access a resource based on the submitted answers. In the opposite direction, the authentication system 200 may communicate, via the cellular backhaul of the network 204, with the mobile device 220 or the authentication user device 212 to present the user (e.g., the driver of vehicle 217) of the mobile device 220 or authentication user device 212 with one or more challenge questions for authenticating the user. Based on the answers submitted by the user for the one or more challenge questions, the authentication system 200 may transmit a notification to the mobile device 220 or the authentication user device 212 of whether or not the user is authenticated to access a requested resource. In some embodiments, the mobile device 220 and/or the authentication user device 212 may communicate back and forth with the authentication system 200 over the Internet, such as through a web portal. As shown in FIG. 2, it should be understood that the mobile device 220 or authentication user device 212 may connect to the network 204 even if it is removed from the vehicle 217.

In some embodiments, there may be multiple vehicles 217 that are covered by an insurance policy of one individual, wherein the individual may be signed up for telematics-based authentication services for each of his or her vehicles 217. Although FIG. 2 illustrates only one vehicle 217, the authentication system 200 may be configured to communicate with multiple vehicles 217 simultaneously (e.g., at or around the same time), and the multiple vehicles 217 may be associated with multiple individuals. The authentication system 200 may receive telematics data for respective users associated with multiple vehicles simultaneously, store the telematics data for respective users in data stores simultaneously, receive requests to authenticate respective users to access one or more computing resources simultaneously, generate sets of challenge questions to authenticate respective users based on the telematics data for each respective user simultaneously, transmit the sets of challenge questions to each respective user simultaneously, receive answers for each challenge question from each respective user simultaneously, and transmit notifications simultaneously to respective users indicating whether or not each respective user has been authenticated based on the answers. The multiple vehicles 217 may be any type of vehicle, including a car, motorcycle, bicycle, scooter, drone (or other automated device), truck, bus, boat, plane, helicopter, and the like, wherein the multiple vehicles 217 may be the same or may vary.

In some embodiments, there may be a user or driver associated with the vehicle 217. The driver may be associated with the vehicle 217 if the driver is an owner of the vehicle 217 and/or has access and/or permission to drive or operate the vehicle 217. Additionally or alternatively, a driver may be associated with the vehicle 217 if the driver is identified on an insurance policy that insures the vehicle 217. A driver of the vehicle 217 may interact with and operate an authentication user device 212. In some embodiments, the authentication user device 212 may be a specialized mobile device (e.g., mobile phone), a tablet, laptop, personal computer, and the like configured to perform or carry out aspects associated with telematics-based user authentication services as described herein. For example, the authentication user device 212 may be the same (e.g., integrated with, include substantially the same components and provide substantially the same functionality, or the like) as the mobile device 220 depicted in FIG. 2. The authentication user device 212 may belong to a driver, individual, or customer of an insurance company who is enrolled in the telematics-based user authentication program. In some cases, the authentication user device 212 may be at an insurance provider, and data may be transmitted between the driver and the device 212. Although only one authentication user device 212 is illustrated in FIG. 2, there may be any number of authentication user devices 212, wherein each authentication user device 212 is associated with at least one driver. The authentication user device 212 may further comprise an authentication manager 213, a display 214, and sensors 215. In the case of an authentication user device 212 that is installed in or connected to a vehicle 217 (e.g., an on-board vehicle computing device), the individual is considered to operate that authentication user device 212 by performing the installation or connection of that device in or at the vehicle 217.

The authentication user device 212 may be configured to execute the authentication manager 213 that presents a user interface (e.g., a graphical user interface for a website, application, software program, and the like) on the display 214. The display 214 may comprise a monitor, television, touchscreen, and the like. The user interface of the authentication manager 213 may allow drivers to send requests to access computing resources, receive one or more challenge questions for authenticating the user, send answers for each of the one or more challenge questions, receive notifications on whether or not the user has been authenticated, and update account information or preferences for authentication services provided by the authentication system 200.

The authentication manager 213 may be a self-sufficient program or may be a module, plug-in, or add-on of another program, such as a program used to collect and/or evaluate telematics data representing actions of a vehicle 217, driving behavior of a user associated with a vehicle 217, and/or status updates of a vehicle 217. The authentication manager 213 may have access to telematics data and/or driving behavior data that is collected by the sensors 215 of the authentication user device 212. The sensors 215 may comprise various sensors and/or modules that detect driving data, vehicle location, environmental information, and/or other related factors of a user of a vehicle 217. For example, the sensors 215 may comprise an accelerometer, speedometer, GPS, gyroscope, camera (or other image sensor), audio sensor, pressure sensor, and the like. The authentication manager 213 may also have access to vehicle information (e.g., a vehicle identification number (VIN), make, model, and/or year of a vehicle of a driver), driving data, and/or other information that is collected by the sensors 215 of the authentication user device 212. For example, the sensors 215 may include fuel level sensors, tire pressure sensors, car engine sensors, oxygen sensors, temperature sensors, water sensors, coolant sensors, position sensors, oil pressure gauges and the like. Each of these sensors 215 may be used to monitor various metrics of the vehicle 217 to ensure that the vehicle 217 is properly functioning under safe operating conditions.

In some embodiments, the authentication manager 213 may be downloaded or otherwise installed onto the authentication user device 212 using known methods. Different devices may install different versions of the authentication manager 213 depending on their platform. A driver may launch the authentication user device 212 or by speech or a voice input. Additionally, or alternatively, the authentication user device 212 may be configured to execute a web browser (e.g., an application for accessing and navigating the Internet) to access a web page providing an interface for the authentication system. In some embodiments, the authentication user device 212 may also be configured to collect information, such as telematics data. For example, the authentication manager 213 or another program installed on the authentication user device 212 may instruct the authentication user device 212 to collect telematics data in or near real-time using the various sensors 215 and/or vehicle sensors 218 (e.g., accelerometer, speedometer, GPS, gyroscope, magnetometer, car engine sensors, oxygen sensors, temperature sensors, water sensors, coolant sensors, position sensors, oil pressure gauges, and the like). Telematics data may include real-time data regarding a driver's speed, acceleration, braking, steering, turn signals, and the like. The authentication manager 213 may determine driving behavior data and driving patterns/history based on the telematics data. For example, drivers may exhibit different driving behaviors, such as staying within or going above posted speed limits or engaging in or avoiding sudden braking or sharp turning events while driving vehicle 217. This information may be used to generate one or more challenge questions for authentication of users.

The authentication manager 213 or another program may also collect location information, such as GPS coordinates indicating the geographical location of the authentication user device 212 and/or vehicle 217. Based on the collected telematics data, driving behavior data, location information, the authentication manager 213 may present one or more challenge questions for authenticating the user to access a computing resource. In some cases, the authentication manager 213 may generate a set of challenge questions for authenticating the user by parsing telematics data to identify location-related data, time-related data, and route-related data. For example, location-related data may comprise data regarding locations to which the user has driven, such as towns, cities, states, countries, retail establishments, places of business, points of interest, and other types of locations to which the user may travel. Time-related data may comprise data regarding dates and times at which the user has driven to various locations, as well as other timeframes during which the user is typically driving. Route-related data may comprise data regarding the specific routes the user takes while driving to different locations at varying times. For example, routes may include a combination of specific types of roads that the user drives his vehicle on, such as toll roads, highways, turnpikes, country roads, expressways, boulevards, and the like.

In some embodiments, the authentication manager 213 may parse the telematics data and identify one or more anomalies in at least one of the location-related data, time-related data, and route-related data and generate one or more challenge questions for authenticating the user based on the one or more anomalies. For example, anomalies may include one or more locations, times, and/or driving routes that a user has driven that deviate from what is standard, normal, or expected for the user. The authentication manager 213 may recognize certain driving patterns of the user and may identify driving trips that are unusual or atypical of the user's previous driving history. Based on these anomalies, the authentication manager 213 may generate one or more challenge questions that only the user would be able to answer correctly based on his or her knowledge of his own driving history. Additionally, the authentication manager 213 may also utilize at least one of calendar information (e.g., information regarding one or more appointments in the user's calendar), insurance information (e.g., information regarding one or more insurance policies of the user), vehicle information (e.g., information regarding a vehicle make, model, and/or year, fuel economy information of the vehicle, etc.), and/or maintenance information (e.g., information regarding repairs and/or replacements of the user's insured products) in conjunction with telematics data to generate one or more challenge questions for authentication of the user.

Thus, the authentication manager 213 may generate and present one or more challenge questions to the user associated with vehicle 217 through the display 214 of the authentication user device 212. The user may then utilize the authentication manager 213 to select at least one answer choice for each challenge question, and the authentication manager 213 may verify the answer choices of the user. If the user answers at least a subset of the challenge questions correctly (e.g., the number of challenge questions answered correctly are above a predetermined threshold), the user associated with vehicle 217 may be successfully authenticated by the authentication manager 213 for accessing a computing resource.

As further illustrated in FIG. 2, vehicle 217 also includes vehicle operation sensor 218 (similar to one or more sensors 215) capable of detecting and recording various conditions at the vehicle and operational parameters of the vehicle. For example, sensor 218 may detect and store data corresponding to the vehicle's location (e.g., GPS coordinates), time, travel time, speed and direction, rates of acceleration or braking, gas mileage, and specific instances of sudden acceleration, braking, swerving, and distance traveled. Sensor 218 also may detect and store data received from the vehicle's 217 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle on-board diagnostic systems (OBD).

Additional sensors 218 may detect and store the external driving conditions, for example, external temperature, rain, snow, light levels, and sun position for driver visibility. For example, external cameras and proximity sensors 218 may detect other nearby vehicles, vehicle spacing, traffic levels, road conditions, traffic obstructions, animals, cyclists, pedestrians, and other conditions that may factor into a driving data/behavior analysis. Sensor 218 also may detect and store data relating to moving violations and the observance of traffic signals and signs by the vehicle 217. Additional sensors 218 may detect and store data relating to the maintenance of the vehicle 217, such as the engine status, oil level, engine coolant temperature, odometer reading, the level of fuel in the fuel tank, engine revolutions per minute (RPMs), software upgrades, and/or tire pressure.

Vehicle sensor 218 also may include cameras and/or proximity sensors capable of recording additional conditions inside or outside of the vehicle 217. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, and unsecured objects in the vehicle). Sensor 218 also may be configured to collect data identifying a current driver from among a number of different possible drivers, for example, based on driver's seat and mirror positioning, driving times and routes, radio usage, etc. Voice/sound data along with directional data also may be used to determine a seating position within a vehicle 217. Sensor 218 also may be configured to collect data relating to a driver's movements or the condition of a driver. For example, vehicle 217 may include sensors that monitor a driver's movements, such as the driver's eye position and/or head position, etc. Additional sensors 218 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer, along with other biometric sensors.

Certain vehicle sensors 218 also may collect information regarding the driver's route choice, whether the driver follows a given route, and to classify the type of trip (e.g. commute, errand, new route, etc.) and type of driving (e.g., continuous driving, parking, stop-and-go traffic, etc.). In certain embodiments, sensors and/or cameras 218 may determine when and how often the vehicle 217 stays in a single lane or strays into other lane. A Global Positioning System (GPS), locational sensors positioned inside the vehicle 217, and/or locational sensors or devices external to the vehicle 217 may be used to determine the route, speed, lane position, road-type (e.g. highway, entrance/exit ramp, residential area, etc.) and other vehicle position/location data.

The data collected by vehicle sensor 218 (e.g., driving behavior data) may be stored and/or analyzed within the vehicle 217, such as for example by a driving analysis computer 224 integrated into the vehicle, and/or may be transmitted to one or more external devices. For example, as shown in FIG. 2, sensor data may be transmitted via a telematics device 222 to one or more remote computing devices, such as authentication user device 212, mobile device 220, authentication system 200, and/or other remote devices.

As shown in FIG. 2, the data collected by vehicle sensor 218 may be transmitted to an authentication system 200, authentication user device 212, mobile device 220, and/or additional external servers and devices via telematics device 222. Telematics device 222 may be one or more specialized computing devices containing hardware/software components configured to collect real-time information. The telematics device 222 may receive vehicle operation data and driving data from vehicle sensor 218, and may transmit the data to one or more external computer systems (e.g., authentication system 200, insurance system server of an insurance company, financial institution, or other entity) over a wireless transmission network. Telematics device 222 also may be configured to detect or determine additional types of data relating to real-time driving and the condition of the vehicle 217. The telematics device 217 also may store the type of vehicle 217, for example, the make, model, trim (or sub-model), year, and/or engine specifications, as well as other information such as vehicle owner or driver information, insurance information, and financing information for the vehicle 217.

In some cases, the telematics device 222 may be a device that is plugged into the vehicle's 217 on-board diagnostic (OBD) system (e.g., plugged in through an OBD II connector) or otherwise installed in the vehicle 217 in order to collect data. The telematics device 222 may also collect GPS coordinates, such as through its own GPS receiver. In the example shown in FIG. 2, the telematics device 222 may receive vehicle telematics data from vehicle sensor 218, and may transmit the data to an authentication system 200. As mentioned above, this vehicle telematics data may include data indicative of one or more vehicle metrics or driving behavior data, such as based on a driver's speed, acceleration, braking, steering, turn signals, and the like. In other examples, one or more of the vehicle sensors 218 or systems may be configured to receive and transmit data directly from or to an authentication system 200 without using a telematics device. For instance, telematics device 222 may be configured to receive and transmit data from certain vehicle sensors 218 or systems, while other sensors or systems may be configured to directly receive and/or transmit data to an authentication system 200 without using the telematics device 222. Thus, telematics device 222 may be optional in certain embodiments.

In some embodiments, telematics device 222 may be configured to execute an authentication manager 213 that presents a user interface for a driver and/or user to provide inputs to and receive outputs from the authentication system 200. The authentication manager 213 may be downloaded or otherwise installed onto the telematics device 222 using known methods. Once installed onto the telematics device 222, a driver may launch the authentication manager 213 by, for example, operating buttons or a touchscreen on the dashboard of the vehicle 217 or by speech or a voice input. Additionally, or alternatively, the telematics device 222 may be configured to execute a web browser to access a web page providing an interface for the authentication system 200.

FIG. 2 also illustrates a mobile device 220 which may be any mobile device of a user associated with vehicle 217. In particular, the mobile device 220 may belong to a driver of the vehicle 217, wherein the driver is a customer of an insurance company and enrolled in a program that allows the driver to participate telematics-based user authentication services. Mobile device 220 may be, for example, a smartphone or other mobile phone, personal digital assistant (PDA), tablet computer, and the like, and may include some or all of the elements described above with respect to the user devices 104a-c. As shown in this example, some mobile devices (e.g., mobile device 220) may be configured to establish communication sessions with vehicle-based devices and various internal components of vehicle 217 via wireless networks or wired connections (e.g., for docked devices), whereby such mobile devices 220 may have secure access to internal vehicle sensors 218 and other vehicle-based systems.

However, in other examples, the mobile device 220 might not connect to vehicle-based computing devices and internal components, but may operate independently by communicating with vehicle 217 via their standard communication interfaces (e.g., telematics device 222, etc.), or might not connect at all to vehicle 217. In some cases, the mobile device 220 may be configured similarly to the authentication user device 212 and may interface or communicate with the telematics device 222 via a wired connection (e.g., USB, OBD II connector, and the like) or a wireless connection (e.g., Bluetooth). In some embodiments, both telematics device 222 and mobile device 220 (or an authentication user device 212) may be employed, whereas in another embodiment, only one of these devices may be used with the authentication system 200 to collect driving behavior data for telematics-based user authentication. For example, a driver associated with the vehicle 217 may choose whether he or she wishes to use his or her mobile phone to capture telematics data or whether he or she wishes to have a device plugged into the vehicle 217 to collect telematics data.

Additionally, the authentication system 200 illustrated in FIG. 2 may include one or more subsystems, application servers, computing devices, and other equipment (e.g., conference bridge equipment) used by company (e.g., insurance provider) personnel to implement and provide telematics-based user authentication described herein. For example, the authentication system 200 may further include a data collection module 202 and an authentication module 204. The authentication module 204, in this example, may be configured to perform the authentication process using at least one of the telematics data 206, insurance data 234, maintenance data 236, vehicle data 238, and/or calendar data 240.

The data collection module 202, in this example, may be configured with programmed instructions to manage the collection of information provided by the telematics device 222, the mobile device 220, or the authentication user device 212. The data collection module 202, in this example, thus may represent the interface between the authentication system 200 and the telematics device 222, the mobile device 220, and the authentication user device 212. The data collection module 202 may be configured to receive communications from the telematics device 222, the mobile device 220, and/or the authentication user device 212, extract information from those communications, and store the extracted information as telematics data 206, insurance data 234, maintenance data 236, vehicle data 238, and/or calendar data 240. In some embodiments, the data collection service 212 may specify a required format for the communications. The format may specify the parameters that should be used to transmit information to the authentication system for storage as telematics data 206, insurance data 234, maintenance data 236, vehicle data 238, and/or calendar data 240. For example, the format may specify that a communication should provide one or more of a user identifier, a date, a time, an information type, and an information payload. The data collection service 212 may be configured to passively receive communications containing new information for storage as telematics data 206, insurance data 234, maintenance data 236, vehicle data 238, and/or calendar data 240. Additionally or alternatively, the data collection service 212 may be configured to actively request new information from the telematics device 222, the mobile device 220, and/or the authentication user device 212, e.g., at regular or irregular intervals or in response to a triggering event. For example, the data collection service 212 may actively request new information from the telematics device 222, the mobile device 220, and/or the authentication user device 212 in response to a determination that a threshold percentage of the telematics data 206, insurance data 234, maintenance data 236, vehicle data 238, and/or calendar data 240 associated with a particular individual is older than a predetermined timeframe (e.g., one week, two weeks, or any other period of time).

As seen in FIG. 2, the telematics device 222, the mobile device 220, and/or the authentication user device 212 may provide information to the authentication system 200 for storage as telematics data 206, insurance data 234, maintenance data 236, vehicle data 238, and/or calendar data 240. In some embodiments, the telematics data 206, insurance data 234, maintenance data 236, vehicle data 238, and/or calendar data 240 may represent one or more data stores or databases storing information (e.g., information collected by the data collection module 202) in the authentication system 200. The telematics data 206 may further include a variety of types of data, such as location data 226, sensor data 228, route data 230, and time data 232. The types of telematics data depicted in FIG. 2 and listed above are provided by way of example only. The telematics data 206 stored at the authentication system 200 may include additional and alternative types of telematics data which will be appreciated with the benefit of this disclosure.

The various types of telematics data 206 may include data describing or otherwise associated with various types of driving behaviors. For example, location data 226 may comprise data regarding locations to which the user has driven, such as towns, cities, states, countries, retail establishments, places of business, points of interest, and other types of locations to which the user may travel. Sensor data 228 may comprise data regarding various sensor measurements (e.g., from sensors 215, 225 or 218) associated with the vehicle 217. For example, sensor data 228 may include driver's speeds, accelerations, braking, Global Positioning System (GPS) latitude and longitude coordinates, elevation, vehicle location, and the like. Route data 230 may comprise data regarding the specific routes the user takes while driving to different locations at varying times. For example, route data 230 may include data regarding a combination of specific types of roads that the user drives his vehicle on, such as toll roads, highways, turnpikes, country roads, expressways, boulevards, and the like. Time data 232 may comprise data regarding dates and times at which the user has driven to various locations, as well as other timeframes during which the user is typically driving.

The data collection module 202 may collect the telematics data 206 and parse the data to identify the location data 226, the sensor data 228, the route data 230, and the time data 232, in which the different types of data may be used by the authentication module 204 to generate one or more challenge questions for authenticating a user. Furthermore, the authentication module 204 may utilize insurance data 234, maintenance data 236, vehicle data 238, and calendar data 240 in addition to the telematics data 206 for generating the one or more challenge questions. Insurance data 234 may comprise data regarding a user's one or more insurance policies (e.g., auto insurance, home insurance, renters insurance, and the like), the user's insured products (e.g., one or more vehicles, home, rental properties, and the like), types of insurance coverage of the user, the user's deductible costs, the user's insurance premium costs, insurance claims for the user, and the like.

Maintenance data 236 may comprise data on user's maintenance-related activities for various insured products. For example, maintenance data 236 may include information on when the user previously received an oil change (or another vehicle service) for his or her vehicle, how much the user paid for the oil change (or another vehicle service), when the user replaced a water heater (or another feature) in his or her home, what type of water heater (or another feature) the user purchased for his or her home, how much the user paid for a feature replacement in his or her home, when the user last took his or her vehicle to a service center for inspection, and the like. Vehicle data 238 may comprise data regarding a vehicle identification number (VIN), make, model, and/or year of each vehicle associated with a user. For example, a user may own multiple vehicles (e.g., vehicle 217), and the vehicle data 238 may comprise data for each of the vehicles covered by the user's auto insurance policy. Calendar data 240 may include data regarding past or future meetings, appointments, invitations, anniversaries, and other types of activities or events that a user may keep track of in a calendar.

In particular, the authentication module 204 may be configured with programmed instructions to parse the different types of data accessible to the authentication system 200 and generate one or more challenge questions to be presented to a user during an authentication process. In some embodiments, the authentication module 204 may be implemented as an independent application or program at a computing device or as a component (e.g., with a set of instructions) of a single software application. In additional embodiments, the authentication module 205 may comprise an instruction module that is configured to invoke, communicate, or otherwise interact with other instruction modules in the authentication system (e.g., data collection module 202). Other configurations and arrangements of the data collection module 202 and the authentication module 204 may be selectively employed, e.g., one or more of the instruction modules in the authentication system 200 modules may be located on individual computing devices distributed across an internal and/or external network that are in signal communication with each other via the network.

Given the various types of data that may be collected and stored by instruction modules 202 and 204, various types of challenge questions may be generated. Examples of challenge questions based on location data 226 may include "Which road is the comic book store you visited Saturday morning located on?" and "Where did you stop at on your commute back home from work yesterday?" Examples of challenge questions based on sensor data 228 may include "At what speed (or range of speeds) were you driving during your commute to work this morning?" and "Based on your fuel level sensors, when did you last refuel your vehicle?" Examples of challenge questions based on route data 230 may include "What route did you take to work last Thursday?" and "Which highways and/or roads did you travel on for 100 miles last week?" Examples of challenge questions based on time data 232 may include "What time did you reach work last Monday?" and "How long was your vehicle parked at work for last Friday?" Examples of challenge questions based on insurance data 234 may include "How much do you pay for your car insurance premium?" and "Which insurance policies do you currently have with Insurance Provider A?" Examples of challenge questions based on maintenance data 236 may include "When did you last replace your air conditioning unit in your home?" and "On what day did you take your vehicle to the dealership for an inspection?" Examples of challenge questions based on vehicle data 238 may include "Which vehicle were you driving last Tuesday?" and "What is the fuel economy of your vehicle?" Examples of challenge questions based on calendar data 240 may include "When did you meet with Bob C. last week?" and "Who recently invited you to play golf next Wednesday?" The challenge questions listed above are provided to illustrate the range of challenge questions that the authentication module 204 may generate from the data collected from the telematics device 222, the mobile device 220, or the authentication user device 212.

The authentication module 204 may also generate answer choices for each challenge question based on the collected data from the telematics device 222, the mobile device 220, or the authentication user device 212. For example, the authentication module 204 may include in an answer set multiple possible answers to the challenge question including the correct answer, and the correct answer in the answer set may correspond to data obtained from the telematics device 222, the mobile device 220, or the authentication user device 212. The number of possible answers may depend on the constraints of a particular implementation. Accordingly, authentication module 204 may be configured to first select how many answer selections to include in the answer set. The number of answer selections may be a configurable parameter in the authentication system 200.

The authentication module 204 may also be configured to generate one or more incorrect answers for the answer set based on the collected data from the telematics device 222, the mobile device 220, or the authentication user device 212. For quantitative answers (e.g., dates, times, etc.), the authentication module 204 may generate answer selections above and below the correct answer, e.g., by adding to or subtracting from the quantitative value corresponding to the correct answer. For example, the correct answer to the question, "Around what time did you eat at Uncle Jose's last week?" may be "around 7:30 PM." Accordingly, an example answer set that may be generated for this question may include the following answer selections: (a) "around 11:30 AM," (b) "around 12:30 PM," (c) "around 1:30 PM," (d) "around 2:30 PM," (e) "around 5:30 PM," (f), "around 6:30 PM," (g) "around 7:30 PM," and (h) "around 8:30 PM." As another example, the correct answer to the question, "On what date did you eat at Uncle Jose's last week?") is "on February 24th." Accordingly, an example answer set that may be generated for this additional question may include the following answer selections: (a) "on February 21st," (b) "on February 22nd," (c) "on February 23rd," (d) "on February 24th," (e) "on February 25th," (f) "on February 26th," and (g) "on February 28th." Additional examples will be appreciated with the benefit of this disclosure. With respect to non-quantitative values, the authentication module 204 may be configured to select answers of the same type as the correct answer. For example, where the correct answer is a day of the week, the authentication module 204 may include each day of the week as an answer selection in the answer set. Additional examples will be appreciated with the benefit of this disclosure.

Examples of questions and corresponding answers that may be generated by the authentication module 204 and presented to a user are shown in the tables below.

TABLE 1

EXAMPLE LOCATION-
RELATED QUESTION.
Where did you have dinner
this past Wednesday?

(A) Uncle Jose's
(B) Uncle Jiro's
(C) Uncle Jacque's
(D) Uncle John's
(E) Uncle Jafar's
(F) Uncle Joshua's
(G) Uncle Johann's

TABLE 2

EXAMPLE TIME-
RELATED QUESTION.
What time did you drive back home
on Feb. 24, 2015?

(A) 5:30 PM
(B) 5:35 PM
(C) 5:40 PM
(D) 5:45 PM
(E) 5:50 PM
(F) 5:55 PM
(G) 6:00 PM

TABLE 3

EXAMPLE ROUTE-
RELATED QUESTION.
What route did you take
for a 2 PM appointment
on Jul. 13, 2016?

(A) Interstate Highway A
(B) Expressway B
(C) Parkway C
(D) Turnpike D
(E) Tollway E
(F) Boulevard F
(G) Country RoadG

TABLE 4

EXAMPLE RELATED-
RELATED QUESTION.
Which vehicle did you drive
last Saturday evening?

(A) Vehicle Make 1, Model A
(B) Vehicle Make 2, Model B
(C) Vehicle Make 3, Model C
(D) Vehicle Make 2, Model B
(E) Vehicle Make 2, Model B
(F) Vehicle Make 2, Model B
(G) Vehicle Make 2, Model B

TABLE 5

EXAMPLE INSURANCE-
RELATED QUESTION.
How much is your deductible for
your home insurance policy?

(A) $300
(B) $350
(C) $400
(D) $450
(E) $500

TABLE 5-continued

EXAMPLE INSURANCE-
RELATED QUESTION.
How much is your deductible for
your home insurance policy?

(F) $550
(G) $600

TABLE 6

EXAMPLE INSURANCE-
RELATED QUESTION.
What is the weekly temperature setting
on your home thermostat during
the hours of 9:00 AM to 5:00 PM?

(A) 72°
(B) 73°
(C) 74°
(D) 75°
(E) 76°
(F) 77°
(G) 78°

TABLE 7

EXAMPLE MAINTENANCE-
RELATED QUESTION.
When did you last get an oil
change for Vehicle A?

(A) Last Sunday
(B) Last Monday
(C) Last Tuesday
(D) Last Wednesday
(E) Last Thursday
(F) Last Friday
(G) Last Saturday In the examples above, the challenge questions are multiple choice questions. In example implementations, other types of questions may be selectively employed, e.g., fill-in-the-blank, matching, true/false, and the like.

In additional embodiments, the authentication module 204 may be configured to generate challenge questions at various points. For example, the authentication module 204 may generate challenge questions based on the telematics data 206, insurance data 234, maintenance data 236, vehicle data 238, and/or calendar data 240 as soon as the authentication system 200 receives, processes, and stores the data collected from the telematics device 222, the mobile device 220, or the authentication user device 212. In other words, the authentication module 204 may generate one or more challenge questions before an authentication request is received, and store the challenge questions generated in a data store or database accessible to the authentication system 200. In response to receiving an authentication request from a user (e.g., via the mobile device 220 or the authentication user device 212), the authentication module 204 may select one or more challenge questions previously generated and transmit the one or more selected challenge questions to the mobile device 220 or the authentication user device 212 to present to the user being authenticated. Additionally or alternatively, the authentication module 204 may generate one or more challenge questions in response to receipt of the authentication request itself.

Figure 3:
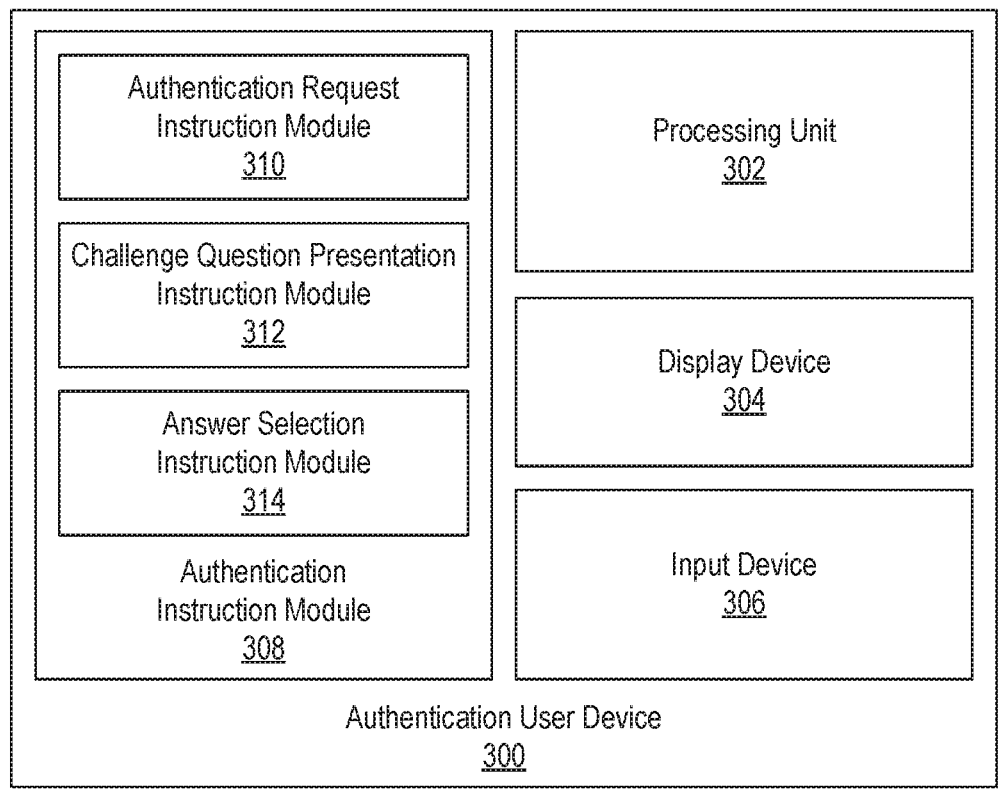
FIG. 3 depicts an example of an implementation of a user device in accordance with aspects described herein.

In FIG. 3, an example of an implementation of an authentication user device 300 is shown. The authentication user device 300 may be in signal communication with a remote computing system that handles the authentication process. Accordingly, the authentication user device 300 may transmit the authentication request to the remote computing system, receive the challenge questions in response, receive user input that selects respective answers to the challenge questions, and transmits the answer selections back to the remote computing system. In this regard, the authentication user device 300, in this example, includes a processing unit 302 having one or more processors, a display device 304 (e.g., a display screen) that presents the challenge questions and corresponding answer sets, an input device 306 (e.g., a touchscreen) used to provide the user input.

The user device 300, in this example, also includes an authentication instruction module 308 configured to facilitate the authentication process at the user device. Accordingly, the user device 300, in this example, includes an authentication request instruction module 310, a challenge question presentation instruction module 312, and an answer selection instruction module 314. The authentication request instruction module 310, in this example, is configured to generate and transmit the authentication request. The challenge question presentation instruction module 312, in this example, is configured to generate the user interface based on the challenge questions received in response to the authentication request. The answer selection instruction module 314, in this example, is configured to generate and transmit the response to the challenge questions that includes the selected answer.

Figure 4:
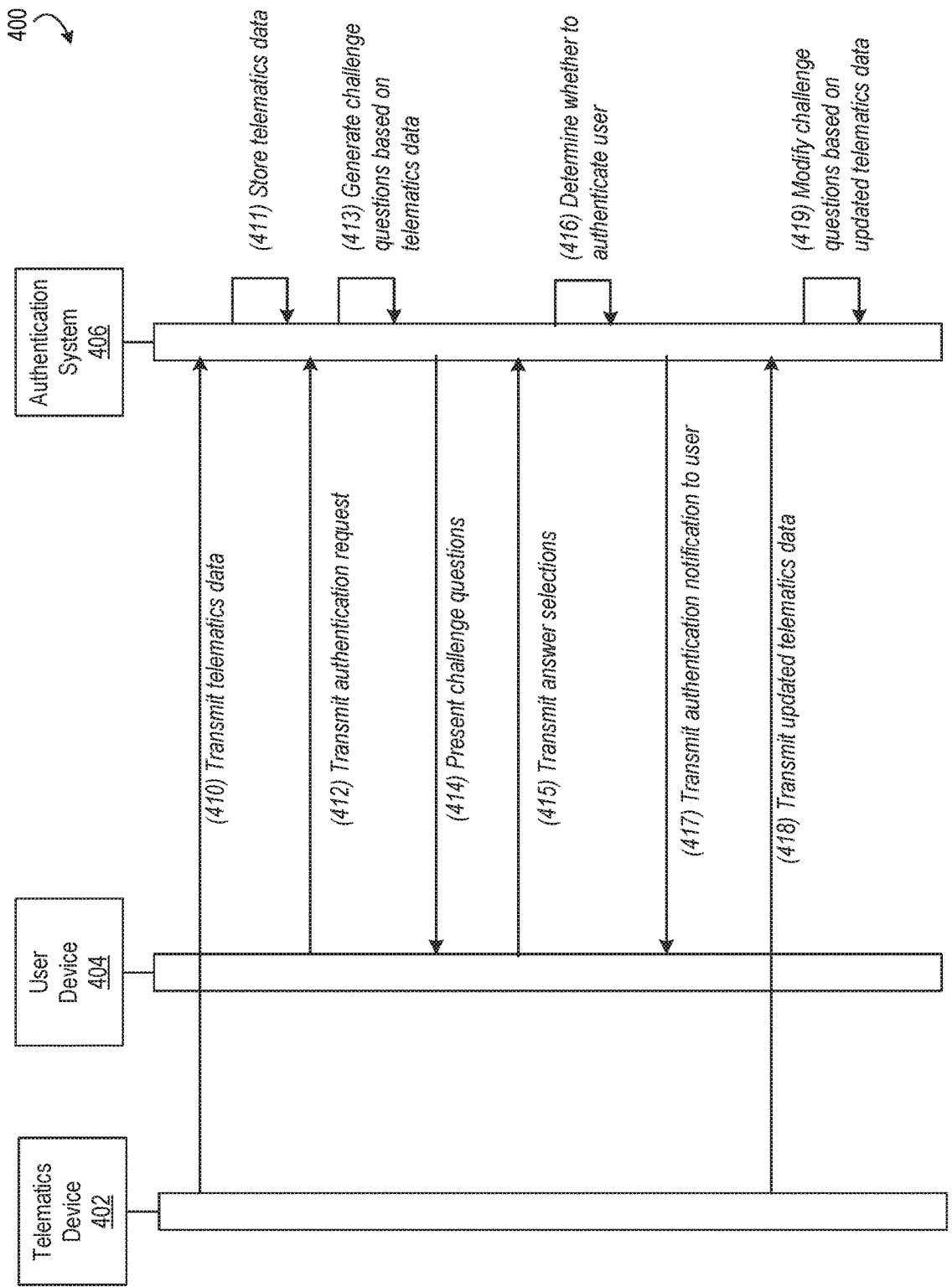
FIG. 4 depicts a sequence diagram of an example authentication process in accordance with aspects described herein.

FIG. 4 illustrates a sequence diagram of an example authentication process in accordance with one or more example embodiments. As seen, a telematics device 402 and a user device 404 are in signal communication with an authentication system 406. In some embodiments, the telematics device 402, the user device 404, and the authentication system 406 may be the same as or similar to the telematics device 222, the authentication user device 212, and the authentication system 200, respectively, illustrated in FIG. 2. At step 410, the telematics device 402 may transmit, to the authentication system 406, telematics data comprising real-time data collected by one or more sensors arranged in a vehicle that a user is driving. At step 411, the authentication system 406 may store the telematics data in a memory or data store accessible to the system 406. At step 412, the user device 404 may transmit, to the authentication system 406, an authentication request that includes, e.g., user information, location information, date information, and time information, and the authentication system 406 may identify and store the authentication context of the request.

At step 413, the authentication system 406 may generate one or more challenge questions based on the telematics data stored in the memory or data store. At step 414, the authentication system 406 may transmit the one or more challenge questions to the user device 404, in which each challenge question may include a corresponding answer set. Upon receipt of the challenge questions, the user device 404 may present the challenge questions to the user and receive answer selections from the user. At step 415, the user device 404 may transmit the answer selections from the user to the authentication system 406. Upon receipt of the answer selections, at step 416, the authentication system 406 may determine whether to successfully authenticate the user based on whether the user correctly answered the challenge questions. At step 417, the authentication system 406 then transmit an authentication response or notification back to the user device 404 indicating whether the user has been successfully authenticated. At step 418, the telematics device 402 may transmit, to the authentication system 406, updated telematics data recently collected from the one or more sensors in the user's vehicle. At step 419, the authentication system 406 may modify the one or more challenge questions based on the updated telematics data.

Additional and alternative sequences will be appreciated with the benefit of this disclosure. For example, the authentication system 406 may be configured to transmit challenge questions one at a time such that a subsequent challenge question is not transmitted until it has received an answer to a previously transmitted challenge question. In this way, the authentication system 406 may tailor subsequent questions based on whether a previous question is answered correctly or incorrectly. In addition, the authentication requests/responses and the challenge requests/responses may be proxied through a remote computing system residing between the user device 404 and the authentication system 406.

Figure 5:
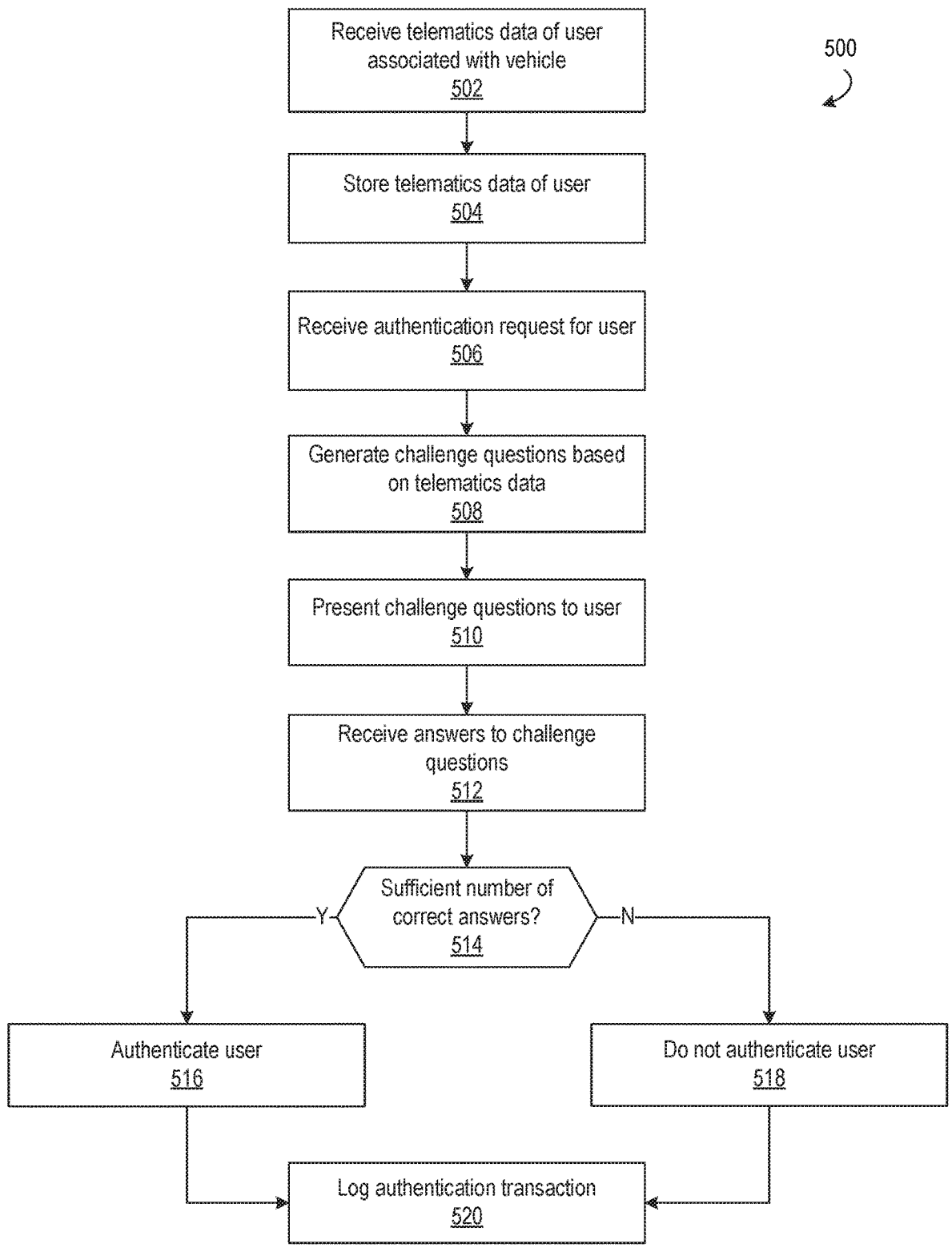
FIG. 5 depicts a flowchart of example method steps for authenticating a user in accordance with aspects described herein.

FIG. 5 illustrates a flowchart 500 of an example method for authenticating a user in accordance with one or more example embodiments. The steps of flowchart 500 may be performed by subsystems, application servers, and computing devices of the authentication system 200 (e.g., authentication module 204, data collection module, etc.). One or more steps of flowchart 500 may be performed by executing an authentication program (e.g., a telematics-based user authentication mobile application or authentication manager 213) and/or by operating a particularly configured computing device (e.g., authentication user device 212) of the authentication system 200.

The method of FIG. 5 may begin with step 502 of receiving telematics data of a user associated with a vehicle. For example, the authentication system 200 may receive telematics data for vehicle 217. In some embodiments, the telematics data of the vehicle 217 may be collected over a period of time by the telematics device 222, authentication user device 212, and/or mobile device 220. At step 504, the authentication system may store the telematics data of the user. For example, the authentication system 200 may store the telematics data in a data store corresponding to telematics data 206, location data 226, sensor data 228, route data 230, and/or time data 232. At step 506, the authentication system may receive a request to authenticate the user. For example, the authentication system 200 may receive an authentication request from the mobile device 220 or the authentication user device 212 of the user to access one or more computing resources.

At step 508, the authentication system may generate one or more challenge questions based on the telematics data of the user. For example, the authentication system 200 may utilize the telematics data 206, location data 226, sensor data 228, route data 230, and/or time data 232 in order to generate one or more challenge questions and answer choices in order to authenticate the user. At step 510, the authentication system may present the one or more challenge questions to the user. For example, the authentication system 200 may transmit the one or more challenge questions to the authentication user device 212 and/or mobile device 220 for presentation to the user. At step 512, the authentication system may receive answers to the challenge questions. For example, the authentication system 200 may receive answers selected by the user from the authentication user device 212 and/or mobile device 220 of the user.

At step 514, the authentication system may determine whether the user answered the challenge questions correctly. For example, the authentication system 200 may determine if the user answered a sufficient number of challenge questions correctly (e.g., a threshold number of challenge questions answered correctly). If the user answered a sufficient number of challenge questions correctly, then the method in this example proceeds to step 516, at which the authentication system 200 authenticates the user to access the one or more requested computing resources via the authentication user device 212 and/or mobile device 220 of the user. If the user did not answer a sufficient number of challenge questions correctly, then the method in this example proceeds to step 518, at which the authentication system 200 does not authenticate the user for accessing the one or more requested computing resources. In some embodiments, after a failed authentication attempt from the user, the authentication system 200 may transmit a request to the authentication user device 212 for secondary authentication information from the user (e.g., information regarding the user's identity such as date of birth, social security number, home address, mother's maiden name, birthplace, street name, and the like). For example, the user may answer one or more challenge questions incorrectly, but the authentication system 200 may request additional information to allow the user a subsequent chance to authenticate successfully for accessing one or more computing resources. In response to receiving the secondary authentication information, the authentication system 200 may verify the secondary authentication information and provide the user with an indication of whether the user has been successfully authenticated.

At step 520, the authentication system may log the authentication transaction and indicate whether the user was successfully authenticated (e.g., by answering the one or more challenge questions correctly or by providing secondary authentication information to the system). For example, the authentication system 200 may log the authentication transaction using the authentication module 204, in which an authentication log entry may include the date and time of the authentication, one or more device identifiers from which the authentication request was received (e.g., a MAC address), one or more virtual locations from which the authentication request was received (e.g., a network domain, an IP address), one or more physical locations the authentication request was received from (e.g., latitude/longitude coordinates, city, state), one or more challenge questions selected to present to the user, the answer sets associated with the challenge questions, the answer selections received from the user, whether the answer selections were correct, and whether the user was successfully authenticated. The authentication transaction log may be subsequently analyzed (e.g., at regular or irregular intervals) to assess the effectiveness of the challenge questions.

As will be appreciated upon reading the disclosure, various aspects described herein may be embodied as a method, a computer system, or a computer program product. Accordingly, those aspects may take the form of an entirely hardware embodiment, an entirely software embodiment, or an embodiment combining software and hardware aspects. In addition, aspects may take the form of one or more computing devices configured to perform specified actions. Furthermore, such aspects may take the form of computer-executable instructions stored by one or more non-transitory computer-readable storage media. Any suitable computer-readable storage media may be utilized, including hard disks, volatile and/or non-volatile memory, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

As noted above, one or more computing devices may be employed to implement aspects of the disclosure. The computing devices may include a processing unit having one or more processors, random access memory (RAM), read-only memory (ROM), one or more input/output (I/O) devices, one or more network interfaces, and data storage at which resides an operating system, one or more applications, and data. The computing devices may include, for example, desktop computers, laptop computers, tablet computers, a handheld computers, a mobile telephones, television settop boxes, network-enabled televisions, network-enabled video game machines, and other types of computing devices configured to exchange wired or wireless communications across electric or electronic communication networks.

The I/O devices may include a microphone, keypad, touch screen, and/or stylus through which a user may provide input to the client computing device. The I/O devices may also include a speaker for providing audio output and a video display device for providing graphical output. Software may be stored at the data storage or ROM to provide instructions to the processing unit which executes the instructions. The networked environment supports connections between the computing devices and with other systems connected to the network. The network may include, for example, one or more of a local area network (LAN) a wide area network (WAN), a wireless telecommunications network, the Internet, and other types of networks that facilitate the exchange of communications between systems and devices. The computing devices may be connected to the network via a network interface which may be, for example, a modem, a network interface card (NIC) or a network adapter. The network interface may be a wired interface, a wireless interface, or both a wired and wireless interface. The network interface may thus include one or more transceivers, digital signal processors, and additional circuitry and software for exchanging wired or wireless communications with other systems and devices via the network. Such communications may be propagated via various network devices such as routers, base transceiver stations, and the like. The computing devices may utilize any of various network protocols such as TCP/IP, Ethernet, FTP, HTTP, and the like as well as any of various wireless communication technologies such as GSM, CDMA, WiFi, and WiMAX.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings.

For example, the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A system comprising:
   a telematics device associated with a vehicle having one or more sensors arranged therein;
   a mobile device of a user associated with the vehicle; and
   a server computer, comprising hardware including a processor and a memory, the server computer configured to:
   receive, from the one or more sensors and via the telematics device, telematics data of the user associated with the vehicle;
   store the telematics data of the user associated with the vehicle in the memory of the server computer;
   receive, from the mobile device, a request to authenticate the user to access an application on the mobile device of the user;
   generate one or more questions for authenticating the user based on the telematics data of the user;
   transmit, to the mobile device, the one or more questions for presentation to the user;
   receive, from the mobile device, one or more answers to the one or more questions;
   transmit, to the mobile device, an indication of whether the user is authenticated and permitted to access the application based on the one or more answers;
   receive, from the one or more sensors and via the telematics device, updated telematics data of the user collected over a second predetermined period of time, wherein the second predetermined period of time is after a first predetermined period of time; and
   modify the one or more questions for authenticating the user based on the updated telematics data of the user.

2. The system of claim 1, wherein the one or more sensors comprise at least one of an accelerometer, speedometer, gyroscope, and GPS, wherein the telematics data comprises real-time data that is collected by the one or more sensors while the user is driving the vehicle.

3. The system of claim 2, wherein the real-time data comprises at least one of a driving speed, an acceleration measurement, a braking measurement, a steering measurement, a number of miles driven for a trip, a road condition rating, a trip time, or a trip duration, and wherein the real-time data is collected over the first predetermined period of time.

4. The system of claim 1, wherein the server computer is further configured to:
   parse the telematics data to identify location-related data, time-related data, and route-related data;
   determine one or more anomalies in at least one of the location-related data, time-related data, and route-related data; and
   generate the one or more questions for authenticating the user further based on the one or more anomalies.

5. The system of claim 1, wherein the server computer is further configured to:
   generate the one or more questions for authenticating the user further based on insurance information of the user or vehicle information of the vehicle, wherein the user is an insurance policy holder, and wherein the vehicle is insured by an insurance company.

6. The system of claim 1, wherein the one or more questions for authenticating the user comprise one or more multiple-choice questions, and wherein the server computer is further configured to:
   generate a plurality of answer choices for each multiple-choice question based on analyzing the telematics data of the user associated with the vehicle.

7. The system of claim 1, wherein the server computer is further configured to:
   receive calendar information associated with the user; and
   generate the one or more questions for authenticating the user further based on the calendar information.

8. The system of claim 1, wherein the server computer is further configured to:
grant access to a computing resource to the user responsive to determining that the user is authenticated.

9. An apparatus comprising:
at least one processor;
a network interface configured to communicate, via a network, with a telematics device and a first computing device; and
a memory storing computer-readable instructions that, when executed by the at least one processor, cause the apparatus to:
receive, from the telematics device, telematics data of a user associated with a vehicle;
store the telematics data of the user associated with the vehicle in the memory;
receive, from the first computing device, a request to authenticate the user to access an application on the first computing device;
generate one or more questions for authenticating the user based on the telematics data of the user;
transmit, to the first computing device, the one or more questions for presentation to the user;
receive, from the first computing device, one or more answers to the one or more questions;
transmit, to the first computing device, an indication of whether the user is authenticated and permitted to access the application based on the one or more answers;
receive, from one or more sensors and via the telematics device, updated telematics data of the user collected over a second predetermined period of time, wherein the second predetermined period of time is after a first predetermined period of time; and
modify the one or more questions for authenticating the user based on the updated telematics data of the user.

10. The apparatus of claim 9, wherein the first computing device comprises a mobile device of the user, and wherein the user is an insurance policy holder.

11. The apparatus of claim 9, wherein the telematics data comprises real-time data that is collected by one or more sensors arranged in the vehicle while the user is driving the vehicle.

12. The apparatus of claim 11, wherein the real-time data comprises at least one of a driving speed, an acceleration measurement, a braking measurement, a steering measurement, a number of miles driven for a trip, a road condition rating, a trip time, or a trip duration, and wherein the real-time data is collected over the first predetermined period of time.

13. The apparatus of claim 9, wherein the computer-readable instructions, when executed by the at least one processor, further cause the apparatus to:
receive calendar information associated with the user; and
generate the one or more questions for authenticating the user further based on the calendar information.

14. The apparatus of claim 9, wherein the computer-readable instructions, when executed by the at least one processor, further cause the apparatus to:
generate the one or more questions for authenticating the user further based on insurance information of the user or vehicle information of the vehicle, wherein the vehicle is insured by an insurance company.

15. The apparatus of claim 9, wherein the one or more questions for authenticating the user comprise one or more multiple-choice questions, and wherein the computer-readable instructions, when executed by the at least one processor, further cause the apparatus to:
generate a plurality of answer choices for each multiple-choice question based on analyzing the telematics data of the user associated with the vehicle.

16. The apparatus of claim 9, wherein the computer-readable instructions, when executed by the at least one processor, further cause the apparatus to:
grant access to a computing resource residing at the apparatus responsive to determining that the user is authenticated.

17. A method comprising:
receiving, at a computing device and from a telematics device associated with a vehicle having one or more sensors arranged therein, telematics data of a user associated with the vehicle;
storing, at a data store of the computing device, the telematics data of the user associated with the vehicle;
receiving, at the computing device and from a mobile device of the user, a request to authenticate the user to access an application on the mobile device of the user;
generating, by at least one processor of the computing device, one or more questions for authenticating the user based on the telematics data of the user;
transmitting, to the mobile device, the one or more questions for presentation to the user;
transmitting, to the mobile device, an indication of whether the user is authenticated and permitted to access the application based on one or more answers;
receiving, from the one or more sensors and via the telematics device, updated telematics data of the user collected over a second predetermined period of time, wherein the second predetermined period of time is after a first predetermined period of time; and
modifying the one or more questions for authenticating the user based on the updated telematics data of the user.

18. The method of claim 17, further comprising:
receiving, by the at least one processor of the computing device, calendar data associated with the user; and
generating, by the at least one processor of the computing device, the one or more questions for authenticating the user further based on the calendar data.

19. The method of claim 17, further comprising:
generating, by the at least one processor of the computing device, the one or more questions for authenticating the user further based on insurance information of the user or vehicle information of the vehicle, wherein the user is an insurance policy holder, and wherein the vehicle is insured by an insurance company.

20. The method of claim 17, further comprising:
granting access to a computing resource residing at the computing device responsive to determining that the user is authenticated.

* * * * *